UNITED STATES PATENT OFFICE.

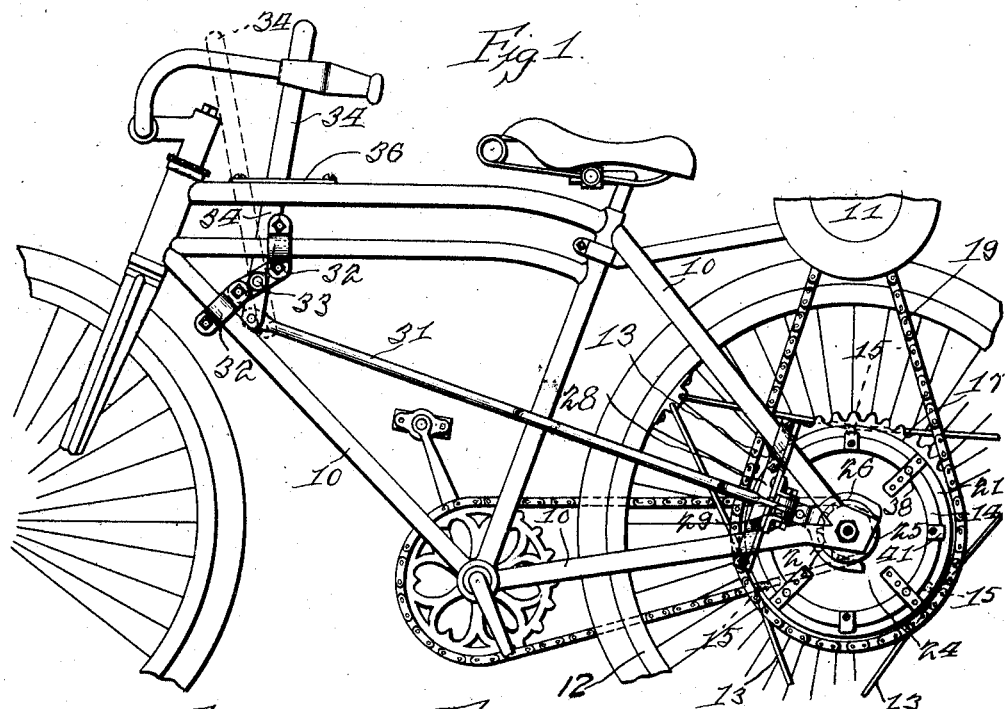

IGNATZ JANZER, OF CHICAGO, ILLINOIS.

CLUTCH.

1,361,585.     Specification of Letters Patent.     Patented Dec. 7, 1920.

Application filed October 4, 1919. Serial No. 328,438.

*To all whom it may concern:*

Be it known that I, IGNATZ JANZER, a citizen of the Republic of Austria, residing at Chicago, in the county of Cook and State of Illinois, have invented certain new and useful Improvements in Clutches, of which the following is a specification.

My invention relates to clutches, and has for its primary object the provision of an improved clutch construction which shall be very compact so as to be operable in a narrow space, such, for example, as is found between the rear forks of the ordinary bicycle frame. Another object is to provide, in a narrow, compact form of clutch, a large area of friction surface; and a further object lies in the provision of a clutch which shall be strong and durable and cheap to manufacture.

Other objects and advantages of the invention will appear from the following description, taken in conjunction with the accompanying drawings which form a part of this specification and illustrate the preferred embodiment of the invention.

In the drawings:

Figure 1 is a fragmentary side elevation of a motor driven bicycle, illustrating the present invention, in left side elevation, mounted therein.

Fig. 2 is a detached and slightly enlarged detail of the clutch as viewed in Fig. 1.

Fig. 3 is a section on line 3—3 of Fig. 2.

Fig. 4 is a right side elevation of the clutch on the scale of Fig. 2.

Fig. 5 is a detached top plan view of the clutch controlling mechanism.

Fig. 6 is a top plan view of a catch whereby the clutch may be indefinitely held in inoperative position.

The drawings, for purposes of illustration. show a motor driven bicycle equipped with my invention. the bicycle frame being numbered 10, carried by the usual front and rear wheels, the motor being generally indicated at 11.

By means of the well known arrangement of triangularly disposed suspension wires 13, a centering ring 14 is coaxially fixed to the tractor wheel 12, three bolts 15 being employed for this purpose. A radially extending peripheral friction flange 16, formed at the right side of the centering ring, gives the latter that L-shaped cross-sectioned contour seen in Fig. 3. A power wheel 17 is journaled on centering ring 14 and has also a slight axial movement thereon to increase or diminish its frictional side contact with the friction flange 16. This power wheel is provided with sprocket teeth 18 and is continuously rotated by a chain 19 driven by motor 11. Surrounding the centering ring 14 and mounted for limited axial movement thereon is a friction ring 21 adapted to frictionally bind the power wheel between itself and the friction flange 16, thus rigidly uniting the power wheel, the centering ring and the tractor wheel.

To prevent rotation of the friction ring 21 on the centering ring 14, the friction ring is provided with a plurality of spaced, inwardly projecting fingers 22 each of which is rigidly fastened at its outer end to the friction ring and traverses an axially extending slot 23 cut in the left side of the centering ring. Riveted upon the inner ends of the fingers 22 is a plate 24 having a hub 25 peripherally channeled to receive the bifurcated rearwardly projecting arm 26 of a clutch-operating bell-crank lever generally indicated at 27. The latter is pivoted to a lever bracket 28 fastened to frame 10 and has an outwardly extending arm 29 to which is pivotally pinned the rear end of a clutch operating rod 31. A handle bracket 32 is bolted to the forward portion of frame 10 and to it is pivoted on a horizontal axis 33 a clutch-operating lever 34 of spring metal. The forward end of rod 31 is pivoted to the short lower end of lever 34, while the long upper end of the latter is grasped and manipulated to operate the clutch. In the operative position of the clutch the lever 34 occupies the dotted line position of Fig. 1, while the clutch may be held in inoperative position by snapping lever 34 into the recess 35 of a catch bar 36 secured on frame 10.

The friction ring 21 is normally held in its operative, clutching position by means of four helical springs 37 each of which surrounds a bolt 38 and is compressed between a nut 39 threaded on the bolt and the right-hand side of centering ring 14. Each of the bolts 38 traverses an aperture provided in ring 14 and has its left end fixed in one of the fingers 22. These springs 37 draw the friction ring 21 in a direction toward the friction flange 16, thus pushing the power wheel 17 tightly against the friction flange and uniting it with the tractor wheel to drive the latter. Obviously the degree of this pressure may be varied by rotation of nuts 39 on their bolts.

In the operation of the invention the operator draws lever 34 to the full line position of Fig. 1, thereby placing the clutch in its inoperative position by drawing the plate 24 and friction ring 21 to the left as viewed in Fig. 3 or toward the observer as viewed in Figs. 1 and 2, this movement being limited by stops 41 screwed to the left face of the centering ring. The motor 11 is now started, causing the power wheel 17 to rotate idly about the centering ring 14. The rider now springs lever 34 out of recess 35, allowing it to move forwardly to the dotted line position of Fig. 1 and releasing the friction ring to the clutching action of springs 37, thus starting motor induced rotation of the tractor wheel and propulsion of the vehicle.

While I have illustrated and described the preferred embodiment of the invention, it will be obvious that one skilled in the art might make modifications thereof without departing from the spirit of the invention. I wish, therefore, not to be restricted to the precise embodiment shown, except in so far as the same is limited in the appended claims.

I claim:

1. In a clutch, the combination with a tractor wheel, of a centering ring coaxially fixed thereon, a radially extending peripheral friction flange formed on the ring, a power wheel journaled on said ring and having frictional side contact with said flange, a friction ring mounted for axial movement without rotation upon the centering ring on that side of the power wheel opposite to said flange, a hub slidably disposed within said centering ring and rigidly connected to said friction ring, springs interposed between the centering ring and said hub whereby the power wheel is normally bound between said friction and centering rings, and mechanism for withdrawing the friction ring from the power wheel.

2. In a clutch, the combination with an annular centering ring having a peripheral friction flange, of a power wheel journaled thereon and axially movable from and against said flange, a friction ring mounted upon said centering ring for axial movement without rotation upon the centering ring, an axially movable hub disposed within said centering ring and fixed to said friction ring and normally spring pressed in a direction toward the friction flange to bind the power wheel fixedly to said centering ring, through the medium of said friction ring and mechanism operable at will to actuate the friction ring in the opposite direction and release the power wheel.

3. In a clutch, the combination of an annular centering ring provided at one side with a radially extending friction face, a hub disposed within said ring and movable axially thereof, a friction ring mounted upon said centering ring and connected to said hub so as to be movable therewith, means for preventing relative rotative movement between said friction and centering rings, a power wheel rotatably mounted upon said centering ring and adapted to be gripped between the friction face of said centering ring and said friction ring, springs acting upon said hub and centering ring to normally clamp said power wheel to said centering ring, and means for imparting axial movement to said hub to thereby retract said friction ring and release said power wheel.

4. In a clutch, the combination with an exteriorly cylindrical centering ring, of a radially projecting friction flange fixed thereon, a friction ring spaced from and opposed to the friction flange and slidable axially upon the centering ring, a plurality of spaced fingers each fixed by its outer end to the friction ring and extending into a guide slot formed in the centering ring and extending axially thereof, a clutch hub axially slidable within the centering ring and to which the inner end of each finger is fixed, a bolt for each finger, fixed by one end thereto, extending loosely through and projecting beyond the centering ring in parallelism with the axis thereof, a nut threaded on the free end of each bolt, a helical spring compressed between each of said nuts and the centering ring, and a power wheel journaled on the centering ring between the friction flange and friction ring.

In testimony whereof I have affixed my signature.

IGNATZ JANZER.